Dec. 14, 1937.     L. D. O. MOITTIE     2,102,373
LATCHING SYSTEM FOR AUTOMOBILES OR OTHER VEHICLES
Filed Dec. 20, 1935     3 Sheets-Sheet 1
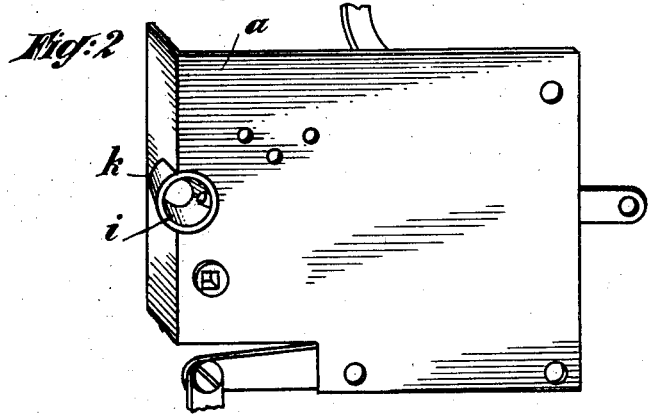
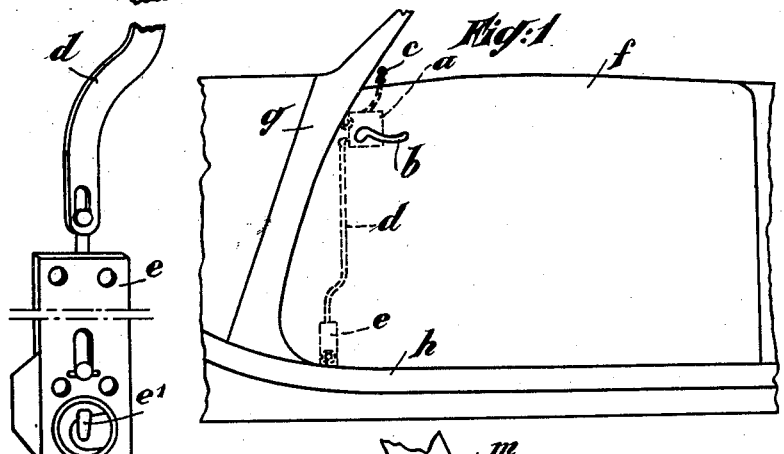
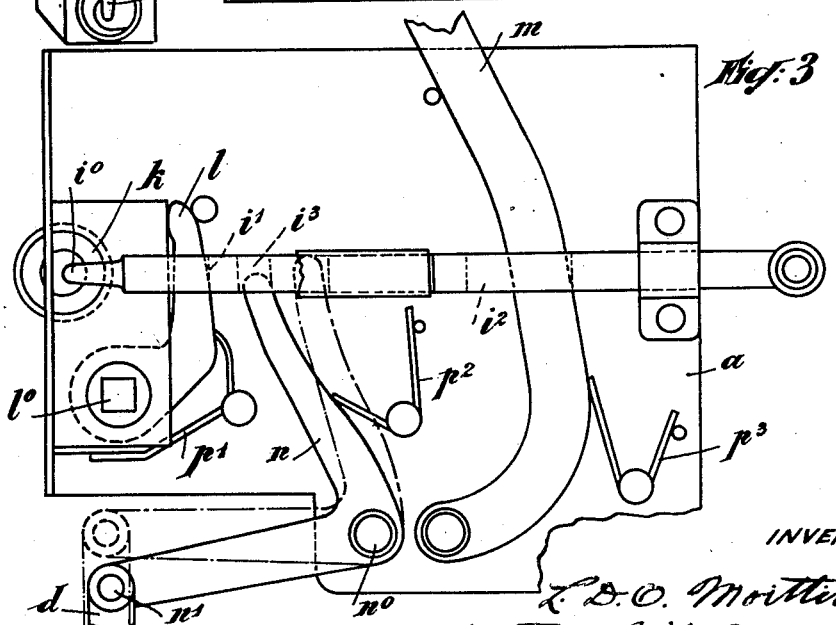

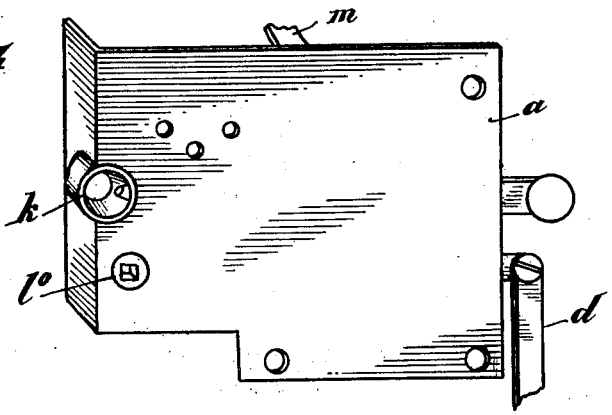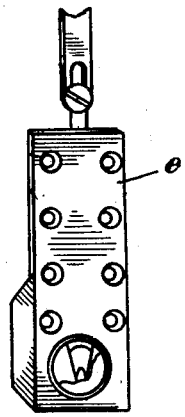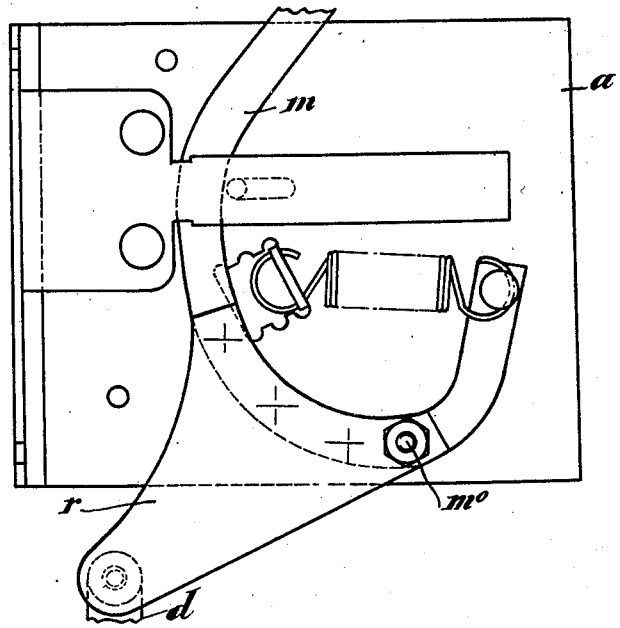

Dec. 14, 1937.　　　L. D. O. MOITTIE　　　2,102,373
LATCHING SYSTEM FOR AUTOMOBILES OR OTHER VEHICLES
Filed Dec. 20, 1935　　　3 Sheets-Sheet 3

INVENTOR
L. D. O. Moittie
By Bateson, Coit, Morse
& Grindle ATTYS.

Patented Dec. 14, 1937

2,102,373

UNITED STATES PATENT OFFICE 2,102,373

LATCHING SYSTEM FOR AUTOMOBILES OR OTHER VEHICLES

Lucien Dominique Octave Moittié, Levallois-Perret, France, assignor to Société Anonyme des Etablissements Repusseau & Cie, Levallois-Perret, France, a company of France Application December 20, 1935, Serial No. 55,478
In France January 5, 1935

4 Claims. (Cl. 292—34)

At the present time, the doors of automobile vehicles are kept in the closed position by means of a central latch mechanism, that is to say a latch mechanism located substantially at mid-distance between the top and bottom of a door post in the case of a closed body or at the top of said post in the case of an open bodywork. This latching arrangement, which permits relative displacements of the upper and lower corners of the door with respect to the adjacent parts of the bodywork (door post, roof longitudinal member, body bottom side member) is generally completed by auxiliary means, such as felt and rubber bands, holding lugs, wedging parts, etc., for preventing the door from vibrating with respect to the frame.

There also exist bodyworks including two latch mechanisms fixed respectively at the upper and lower corners of the door and controlled by means of a central member. This arrangement has the disadvantage of failing to ensure in all cases a perfect latching, and therefore a perfect holding of the door, since the considerable distance between the two latch mechanisms permits the wood of the door to be deformed between them.

The object of the present invention is to provide a latching system which obviates these drawbacks in connection with a vehicle including a bodywork, a door and a door frame carried by said bodywork.

According to the essential feature of the present invention, this latching system includes, in combination, two corresponding rigid metallic pieces, carried by said door and a vertical side of said frame respectively, adapted to engage into each other when the door is closed, means for positively interlocking said pieces with each other, another device of similar structure mounted on said door and the lower horizontal side of said frame, and means interposed between the interlocking means belonging to these two devices respectively, for causing them to operate simultaneously.

According to an embodiment of the invention, the movement of the bolt of the upper or central latch (operated in the known manner through a handle or a lever) is transmitted to the bolt of the lower latch through a system of connecting rods and levers, the main connecting rod being disposed either at the front or at the rear of the latch mechanism.

In a modification, the operating lever of the bolt of the central or upper latch is provided with a prolonged part pivoted to the end of said main connecting rod.

Other features of the present invention will result from the following detailed description of some specific embodiments thereof.

Preferred embodiments of the present invention will be hereinafter described, with reference to the accompanying drawings, given merely by way of example, and in which:

Fig. 1 shows the latching device applied to the door of a cabriolet;

Fig. 2 is a detail view of the latching system in the case in which the main connecting rod is disposed at the front part of the central or upper latch of the system;

Fig. 3 is a detailed view of the mechanism of the central or upper latch;

Fig. 4 shows a modification in which the main connecting rod is located at the rear of the latch;

Fig. 7 shows another modification of the arrangement of Fig. 3.

As shown by the drawings, the latching system according to the invention essentially includes a latch, called central latch, $a$, the bolt $i$ of which can be operated in the known manner through a handle $b$, or through a lever $c$.

This latch mechanism is coupled through a connecting rod $d$ with the mechanism of a lower latch $e$ having a vertical bolt and which is therefore located in the lower corner of door $f$. Under these conditions, the door is rigidly connected to the bodywork through the engagement and the latching of the bolt of latch $a$ with post $g$, on the one hand, and the engagement and the latching of the bolt of the lower latch $e$ with the body bottom side member $h$, on the other hand.

According to the invention, these two latches $a$ and $e$ are devised in such manner as to ensure not only a latching by means of bolt and keeper, the keeper being fixed to the door post in the case of lock $a$ and to the body bottom side member in the case of lock $e$, but also an interlocking engagement. The latch is provided with a conical sleeve $k$ in which a conical lug of corresponding shape is adapted to fit when the door is closed. This lug is fixed to the door post in the case of latch $a$ and to the body bottom side member in the case of latch $e$. This conical lug is locked in closed position with respect to the latch mechanism by means of bolt $i$.

In the case of a closed body, the arrangement is the same as that above described and shown with reference to Fig. 1 in the case of a cabriolet, said door being locked to the middle part of the door post and to the body bottom side member.

Connecting rod $d$ may be controlled through means located either at the front of the mechanism of latch $a$ or at the rear thereof. In the first case, this mechanism may be made as shown in Fig. 3. The end $i^0$ of bolt $i$ is arranged to enter, in the closed position, the conical lug (not shown) which is fixed to post $g$ and which engages into conical sleeve $k$, fixed to the casing of latch $a$.

Figure 6:
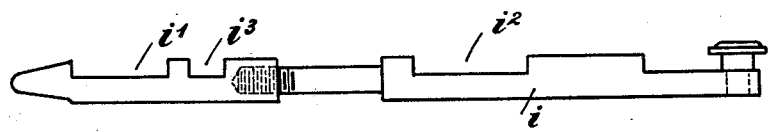
Fig. 6 is a detail view of the bolt.

This bolt $i$ may be actuated in the known manner, either through finger $l$ or spindle $l^0$ or through lever $m$, which engage in recesses of the kind of those shown at $i^1$, $i^2$ in Fig. 6. Bolt $i$ is provided with a third notch or recess $i^3$ in which is engaged the end of a bent lever $n$, pivoted at $n^0$ and the other end $n^1$ of which is pivotally jointed to the end of the connecting rod $d$ which actuates the vertical bolt $e^1$ of latch $e$. Springs $p^1$, $p^2$, $p^3$ act on finger $l$, bent lever $n$, and handle $m$, respectively. It will be readily understood that, under these conditions, any displacement of the bolt $i$ of the main latch $a$ is transmitted to the bolt $e^1$ of the mechanism of the lower latch $e$. In other words, by acting on the handle that operates spindle $l^0$ or handle $m$, both latches $a$ and $e$ are simultaneously operated.

Figure 5:
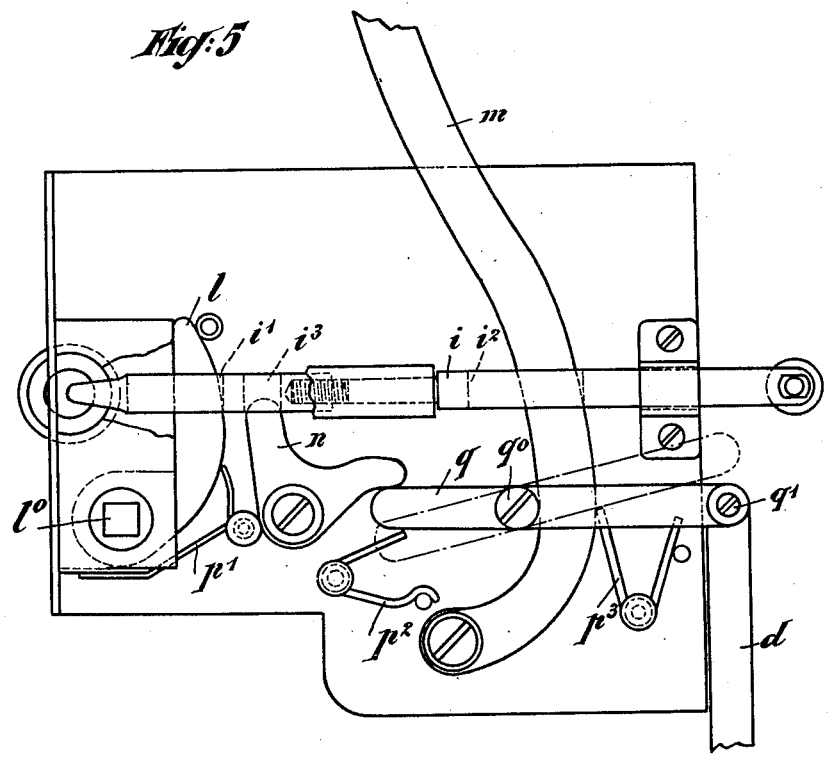
Fig. 5 is a modification of the arrangement shown by Fig. 3.

Instead of being provided at the front of the mechanism of latch $a$, connecting rod $d$ might be provided at the rear thereof, as shown by Fig. 5. In this case, the bent lever $n$ acts upon the end of another lever $q$, pivoted at $q^0$ and the other end $q^1$ of which is pivotally connected to said connecting rod $d$.

Any other arrangement might be used for interconnecting the two latches without departing from the principle of the invention. For instance, connecting rod $d$ might be controlled, as shown in Fig. 7, directly by the handle $m$, pivoted at $m^0$, said handle being provided, for this purpose, with a prolonged portion $r$, to the end of which rod $d$ is pivotally connected. In the simplified latch mechanism shown by Fig. 7, the bolt is actuated merely by a lever, but it will be readily understood that the mechanism might also include a handle for controlling it.

The above description with reference to the drawings concerns the case of a cabriolet door, but the arrangement would be exactly the same in the case of an automobile with a closed body; in this case, the central latch would cooperate with a plate, keeper, or lug, carried by the middle part of the door post.

In a general way, while I have, in the above description, disclosed what I deem to be practical and efficient embodiments of the present invention, it should be well understood that I do not wish to be limited thereto as there might be changes made in the arrangement, disposition, and form of the parts without departing from the principle of the preesnt invention as comprehended within the scope of the accompanying claims.

What I claim is:

1. In a vehicle including a bodywork, at least one door, and a door frame carried by said bodywork, a latching system which comprises, in combination, two corresponding rigid metallic pieces adapted to wedge in each other carried by said door and a vertical side of said frame, respectively, so as to engage each other when said door is closed, means for positively interlocking said pieces in each other, two other corresponding rigid metallic pieces adapted to wedge in each other carried by said door and the lower horizontal side of said frame, respectively, so as to engage each other when said door is closed, means for positively interlocking the two last mentioned pieces in each other, and means interposed between said interlocking means for causing them to operate simultaneously.

2. In a vehicle, including a bodywork, at least one door, and a door frame carried by said bodywork, a latching system which comprises, in combination, two corresponding rigid metallic pieces adapted to wedge in each other carried by said door and a vertical side of said door frame, respectively, so as to engage each other when said door is closed, a horizontal bolt for positively interlocking said pieces in each other, two other corresponding rigid metallic pieces adapted to wedge in each other carried by said door and the lower horizontal side of said frame, respectively, so as to engage each other when said door is closed, a vertical bolt for positively interlocking the two last mentioned pieces in each other, and a connecting rod interposed between said bolts for causing them to operate simultaneously.

3. A latching system according to claim 2 further including an operating member for actuating the first mentioned bolt, a metal piece rigid with said member, and a pivoting connection between said piece and said connecting rod.

4. In a vehicle including a bodywork, at least one door, and a frame for said door carried by said bodywork, a latching system which comprises, in combination, a conical sleeve and a conical member adapted to fit therein carried by said door and a vertical side of said door frame respectively, so as to engage each other when said door is closed, a horizontal bolt adapted to project into said sleeve so as to positively interlock said sleeve and said member together, another similar system, including a conical sleeve and a conical member carried by said door and the lower horizontal side of said frame respectively, so as to engage each other when said door is closed, a vertical bolt adapted to project into the last mentioned sleeve so as to positively lock said last mentioned member therein, both of these sleeves being so positioned as to extend substantially at right angles to the plane of said door when the latter is closed, and connecting means interposed between said bolts for causing them to operate simultaneously.

LUCIEN DOMINIQUE OCTAVE MOITTIÉ.